(12) United States Patent
Amisano et al.

(10) Patent No.: US 7,967,725 B2
(45) Date of Patent: Jun. 28, 2011

(54) METHOD FOR CONTROLLING A POWER ASSISTED PROPULSION SYSTEM IN A MOTOR VEHICLE

(75) Inventors: Fabrizio Amisano, Turin (IT); Aldo Sorniotti, Carmagnola (IT); Mauro Velardocchia, Turin (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 840 days.

(21) Appl. No.: 11/983,805

(22) Filed: Nov. 9, 2007

(65) Prior Publication Data
US 2008/0188347 A1 Aug. 7, 2008

(30) Foreign Application Priority Data
Nov. 9, 2006 (EP) .................................. 06425763

(51) Int. Cl.
*B60W 10/04* (2006.01)
(52) U.S. Cl. ........................ 477/107; 477/110
(58) Field of Classification Search .......... 475/207–209; 477/107, 110, 116; 74/339
See application file for complete search history.

(56) References Cited

U.S. PATENT DOCUMENTS

| | | | | |
|---|---|---|---|---|
| 4,458,546 A | * | 7/1984 | Schreiner et al. | 74/410 |
| 4,693,129 A | * | 9/1987 | Pierce | 74/333 |
| 6,847,878 B2 | * | 1/2005 | Cimmino et al. | 701/56 |
| 2001/0017061 A1 | * | 8/2001 | Friel | 74/375 |
| 2002/0129671 A1 | | 9/2002 | Yamasaki et al. | |

FOREIGN PATENT DOCUMENTS

| | | |
|---|---|---|
| DE | 100 14 879 A1 | 10/2001 |
| DE | 10 2005 013137 A1 | 9/2006 |
| EP | 1 669 638 A | 6/2006 |
| GB | 2 273 323 A | 6/1994 |
| GB | 2 403 523 A | 1/2005 |
| WO | WO 03/047898 A | 6/2003 |
| WO | WO 2006/126876 A | 11/2006 |
| WO | WO 2007/011211 A2 | 1/2007 |

* cited by examiner

*Primary Examiner* — Justin Holmes
(74) *Attorney, Agent, or Firm* — FSP LLC (57) ABSTRACT

A method for controlling a power assisted propulsion system in a motor vehicle so as to perform a transition from a lower gear to a higher gear without interrupting a driving torque applied to driving wheels; the propulsion system displays an internal combustion engine provided with a drive shaft and a power assisted transmission including: a power assisted mechanical gearbox provided with a primary shaft connectable to the drive shaft and a secondary shaft coupled to a transmission shaft which transmits motion to the driving wheels; a power assisted clutch interposed between the drive shaft and the primary shaft of the gearbox to couple and decouple the drive shaft to the primary shaft of the gearbox; a power assisted brake; and an epicycloidal gear having three rotating elements: a first rotating element coupled to the drive shaft, a second rotating element coupled to the secondary shaft of the gearbox, and a third rotating element coupled to the brake.

41 Claims, 4 Drawing Sheets

METHOD FOR CONTROLLING A POWER ASSISTED PROPULSION SYSTEM IN A MOTOR VEHICLE

TECHNICAL FIELD

The present invention relates to a method for controlling a power assisted propulsion system in a motor vehicle.

BACKGROUND ART

Power assisted gearboxes, which are structurally similar to a traditional type manual gearbox except for the fact that the clutch pedal and the gear selection lever operable by the user are replaced by corresponding electric or hydraulic servo controls, are increasingly widespread. By using a servo controlled gearbox, the user only needs to send the command to change to a higher gear or to a lower gear to a transmission control unit and the transmission control unit autonomously performs the change of gear by acting both on the engine and on the servo controls associated to the clutch and gearbox.

A command to change gear may be generated manually, i.e. following a command given by the driver, or automatically, i.e. regardless of the operation by the driver. When the command is generated to perform a change of gear, the transmission control unit drives the servo control associated to the clutch to open the clutch so as to mechanically separate a primary shaft of the gearbox from a drive shaft; at the same time, the transmission control unit acts on the engine control unit to temporarily reduce, if required, the driving torque delivered by the engine itself.

Once the transmission control unit has checked the clutch opening, the transmission control unit drives the servo controls associated to the clutch to disengage the currently engaged gear; when the transmission control unit has checked the disengagement of the gear, the transmission control unit drives the servo controls associated to the gear to engage the new gear. Once the transmission control unit has checked that the new gear has been engaged, the transmission control unit drives the servo controls associated to the gear to engage the new gear.

Finally, when the transmission control unit has checked that the new gear has been engaged, the transmission control unit drives the servo control associated to the clutch to close the clutch so as to render the primary shaft of the gearbox and the drive shaft angularly integral with one another; at the same time, the transmission control unit acts on the engine control unit to restore, if required, the driving torque delivered by the engine itself.

It is apparent that as long as the clutch is open, the drive shaft is disconnected from the primary shaft of the gearbox and therefore from the driving wheels; accordingly, as long as the clutch is open, the driving torque generated by the engine is not transmitted to the driving wheels or, in other words, a "torque hole" occurs for the driving wheels. The currently commercially available last generation power assisted gearboxes, which operate in accordance with the above described method, require a time generally in the range from 250 to 600 ms to perform a change of gear; the time actually employed depends both on the dynamic performance of the gearbox components and on the comfort degree required. Accordingly, the torque hole for the driving wheels caused by a change of gear is clearly perceived by the occupants of the vehicle, as it becomes a considerable discontinuity in the longitudinal acceleration of the vehicle.

It must be noted that the torque hole for the driving wheels caused by a change of gear is clearly perceivable by the occupants of the vehicle when the vehicle is accelerating, i.e. during the progression of the gears (change from a lower gear to a higher gear) or during the down shift of the gears during acceleration (change from a higher gear to a lower gear similar to the "kick-down" of a traditional automatic transmission), because during the acceleration of the vehicle the engine is "boosted" to accelerate the vehicle itself. Instead, when the vehicle is slowing down, i.e. during the down shift of the gears during slowing down (change from a higher gear to a lower gear), the torque hole for the driving wheels caused by a gearbox is not normally perceived by the occupants of the vehicle, because the slowing down of the vehicle is substantially performed by the breaking system and the engine does not have an essential role in the dynamics of the vehicle.

Furthermore, during the progression of the gears and the position of the accelerator being the same, the torque hole for the driving wheels caused by a change of gear has a greater effect on the occupants of the vehicle at lower gears (transition from the first gear to the second gear and from the second gear to the third gear), whereas it has a smaller effect on the occupants of the vehicle at higher gears (transition from the third gear to the fourth gear and following) because at lower gears the vehicle has a much higher instant longitudinal acceleration.

Several inquiries carried out among motor vehicle drivers have revealed that the torque hole for the driving wheels caused by a change of gear is accepted when the power assisted gearbox is driven manually, i.e. when the power assisted gearbox is considered as a substitute for a traditional type manual gearbox, in which the torque hole for the driving wheels is normal and inevitable. The torque hole for the driving wheels caused by a change of gear is instead not accepted when the power assisted gearbox is driven automatically, i.e. when the power assisted gearbox is considered as a substitute for an automatic torque converter gearbox, in which the torque hole for the driving wheels is absent. Accordingly, a power assisted gearbox may not be used as a natural substitute for an automatic torque converter gearbox, although the power assisted gearbox displays a considerably higher performance.

DISCLOSURE OF THE INVENTION

It is the object of the present invention to design a method for controlling a power assisted propulsion system for a motor vehicle, such a control method not displaying the above described drawbacks and being easy and cost-effective to implement.

According to the present invention there is provided a method for controlling a power assisted propulsion system for a motor vehicle according to what as claimed in the attached claims.

BRIEF DESCRIPTION OF THE DRAWINGS

The present invention will now be described with reference to the accompanying drawings, which depict some non-limitative examples of embodiment thereof, in which.

PREFERRED EMBODIMENTS OF THE INVENTION

Figure 1:
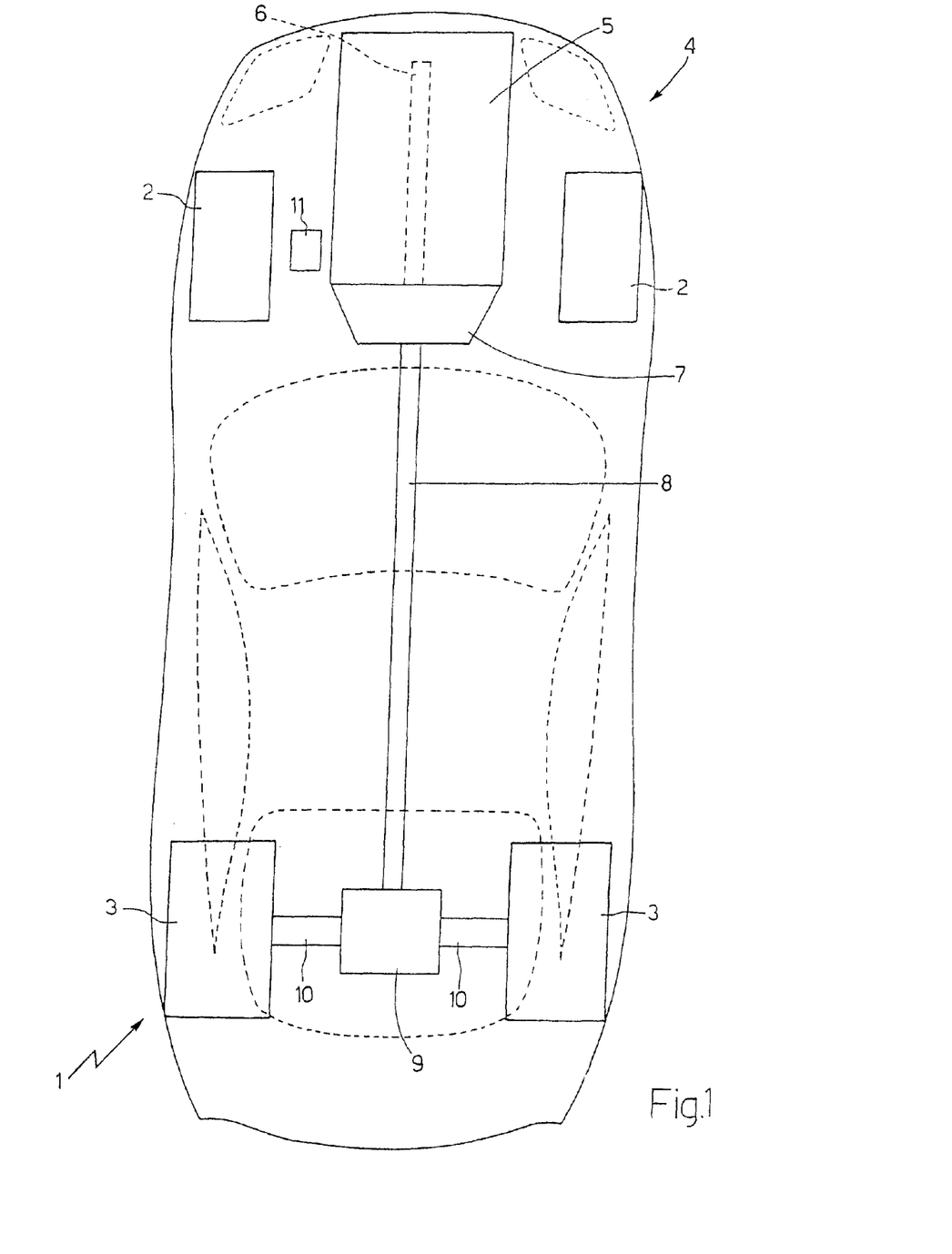
FIG. 1 is a diagrammatic plan view of a rear drive vehicle provided with a power assisted propulsion system which is driven according to the control method which is the object of the present invention.

In FIG. 1, numeral 1 indicates, as a whole, a motor vehicle provided with two front wheels 2 and two rear driving wheels 3, which receive the driving torque from a propulsion system 4.

The propulsion system 4 comprises an internal combustion engine 5, which is arranged in a front position and is provided with a drive shaft 6 which rotates at an angular speed $\omega_m$, and a power assisted transmission 7, which is arranged in a front position, is housed in a container integral with the internal combustion engine 5 and transmits the driving torque generated by the internal combustion engine 5 to the rear driving wheels 3. A transmission shaft 8 extends from the transmission 7 terminating with a differential 9, from which a pair of axle shafts 10 extends, each of which is integral with a rear driving wheel 3. The motor vehicle 1 comprises an electronic control unit 11 (schematically shown), which controls the propulsion system 4 and therefore drives both the internal combustion engine 5 and the power assisted transmission 7.

Figure 2:
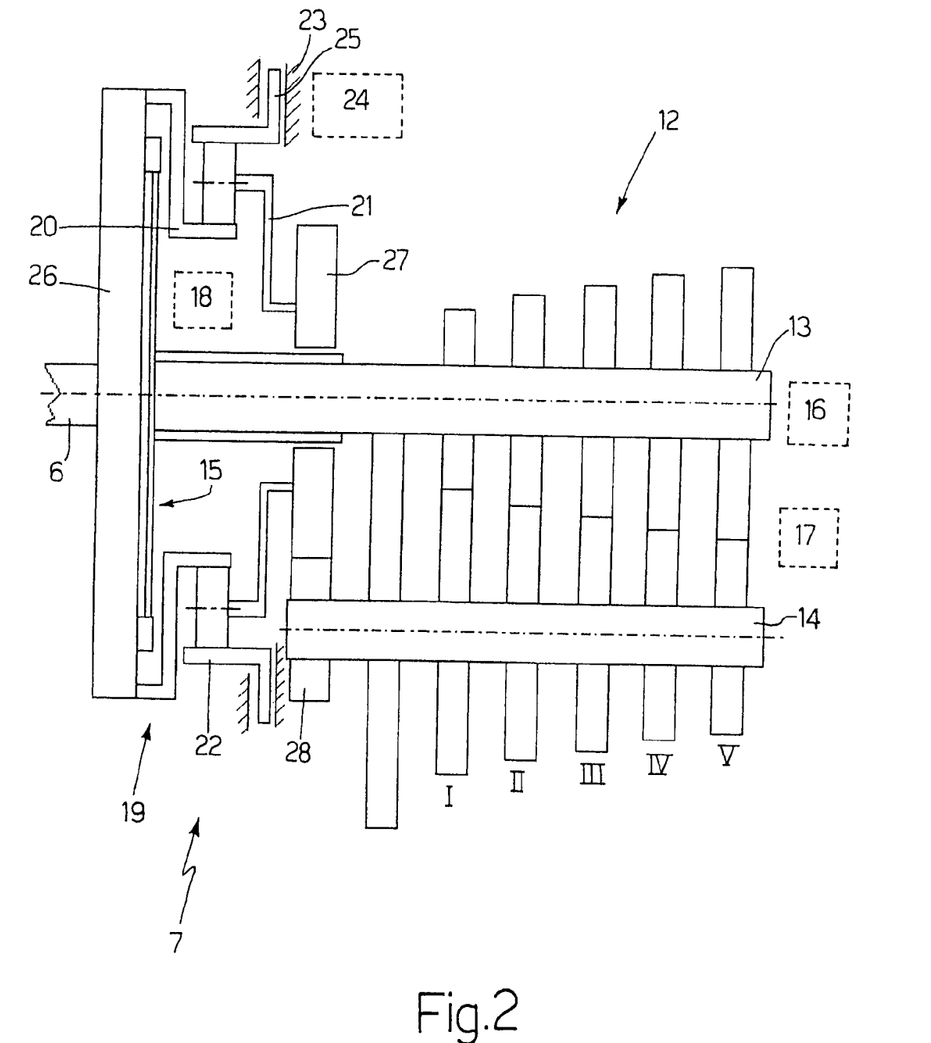
FIG. 2 is a diagrammatic view of a power assisted transmission of the propulsion system of FIG. 1.

According to what is shown in FIG. 2, the power assisted transmission 7 comprises a mechanical power assisted gearbox 12 provided with a primary shaft 13 which rotates at an angular speed $\omega_1$ and which is connectable to the drive shaft 6 and a secondary shaft 14 which rotates at an angular speed $\omega_2$ and which is connected to the transmission shaft 8 which transmits motion to the driving wheels 3. The power assisted gearbox 12 shown in FIG. 2 displays five forward gears which are indicated by Roman numerals (first gear I, second gear II, third gear III, fourth gear IV, fifth gear V). A power assisted disk clutch 15 is interposed between the drive shaft 6 and the primary shaft 13 of the gearbox 12 to connect and disconnect the drive shaft 6 to and from the primary shaft 13 of the gearbox 12.

The mechanical power assisted gearbox 12 is operated by a servo control 16 to engage/disengage a gear and by a servo control 17 to select a gear; the power assisted clutch 15 is operated by a single servo control 18. The servo controls 16, 17 and 18 are preferably of the hydraulic type (they could alternatively be of the electric type) and are driven by the electronic control unit 11.

Furthermore, the power assisted transmission 7 comprises an epicycloidal gear 19 having three rotating elements 20, 21 and 22: a first rotating element 20 connected to the drive shaft 6, a second rotating element 21 connected to the secondary shaft 14 of the gearbox 12, and a third rotating element 22 connected to a power assisted brake 23. According to the embodiment shown in FIG. 2, the first rotating element 20 of the epicycloidal gear 19 is a sun gear, the second rotating element 21 of the epicycloidal gear 19 comprises planet gears (normally two) and a planet carrier, and the third rotating element 22 of the epicycloidal gear 19 is an annulus. According to an alternative embodiment (not shown), the first rotating element 20 of the epicycloidal gear 19 is an annulus, the second rotating element 21 of the epicycloidal gear 19 comprises planet gears (normally two) and a planet carrier, and the third rotating element 22 of the epicycloidal gear 19 is a sun gear.

By way of non-limitative example, the sun gear of the first rotating element 20 could comprise 58 teeth, the two planet gears of the second rotating element 21 could comprise 18 teeth each, and the annulus of the third rotating element 22 could comprise 94 teeth; more generally, the sun gear of the first rotating element 20 could comprise 56-60 teeth, the two planet gears of the second rotating element 21 could comprise 17-19 teeth each, and the annulus of the third rotating element 22 could comprise 90-98 teeth.

The power assisted brake 23 is operated by a single servo control 24, which is preferably of the hydraulic type (it could alternatively be of the electric type) and is driven by an electronic control unit 11; by applying an increasing hydraulic pressure to the servo control 24, the power assisted brake 23 applies an increasing braking torque to the third rotating element 22 of the epicycloidal gear 19. According to a preferred embodiment, an annular flange 25, on which the power assisted brake pads 23 act, is fitted to the third rotating element 22 of the epicycloidal gear 19. Preferably, in order to decrease the vibrations induced by the action of the power assisted brake 23 between the third rotating element 22 of the epicycloidal gear 19 and the power assisted brake 23 there is provided a flexible coupling, which is normally arranged between the third rotating element 22 of the epicycloidal gear 19 and the annular flange 25.

According to the embodiment shown in FIG. 2, the drive shaft 6 is provided with a flywheel 26, which is arranged upstream of the clutch 15 and rotates integrally with the drive shaft 6 itself, and the first rotating element 20 of the epicycloidal gear 19 is integral with the flywheel 26. According to a different embodiment (not shown) the clutch 15 comprises a rotating lid integral with the drive shaft 6 and the first rotating element 20 of the epicycloidal gear 19 is integral with the lid of the clutch 15.

According to a preferred embodiment, the second rotating element 21 of the epicycloidal gear 19 is fitted to a toothed wheel 27 which is centrally hollow (in order to allow the passage of the primary shaft 13 of the power assisted gearbox 12) and engages a further toothed wheel 28 fitted to the secondary shaft 14 of the power assisted gearbox 12.

During use, the above described propulsion system 4 may be operated by a manual mode, i.e. a command to change gear is generated by a command given by the driver, or by an automatic mode, i.e. a gearbox command is generated by the electronic control unit 11 autonomously of the action of the driver. The operation of the above described propulsion system as it performs a change of gear from a current gear A to a following gear B (i.e. the transition from the current gear A to the following gear B), will be described hereafter.

In order to carry out a change of gear from a current gear A to a following gear B, the electronic control unit 11 drives the servo controls 16, 17 and 18 to consecutively carry out a series of operations, each of which must be completed before carrying out the following operation. Generally, the series of operations to be carried out in order to perform a change of gear 12 from a current gear A to a following gear B comprises:

opening the power assisted clutch 15 by driving the servo control 18 to separate the drive shaft 6 from the primary shaft 13 to the power assisted mechanical gearbox 12;

disengaging the current gear A by driving the servo control 16 of the power assisted mechanical gearbox 12;

selecting the following gear B by driving the servo control 17 of the power assisted mechanical gearbox 12;

engaging the following gear B by driving the servo control 16 of the power assisted mechanical gearbox 12; and closing the power assisted clutch 15 by driving the servo control 18 to connect the drive shaft 6 to the primary shaft 13 of the power assisted mechanical gearbox 12 again.

Furthermore, simultaneously to the above described operations carried out by driving the servo controls 16, 17 and 18, the electronic control unit 11 drives the internal combustion engine 5 such that, at the time of closing the power assisted clutch 15, the angular speed $\omega_m$ of the drive shaft 6 is substantially equal to the angular speed $\omega_1$ of the primary shaft 13; it must be noted that, at the time of closing the power assisted clutch 15, the angular speed $\omega_1$ of the primary shaft 13 is set, as it solely depends on the current speed of the motor vehicle 1 and on the gear ratio determined by the following gear B. In the case of gear progression, i.e. during a change from a lower gear to a higher gear, the drive shaft 6 has to be slowed down to equalize the angular speed $\omega_1$ of the primary shaft 13 at the time of closing the power assisted clutch 15, whereas in the case of gear down shift, i.e. during a change from a higher gear to a lower gear, the drive shaft 6 has to be accelerated to equalize the angular speed $\omega_1$ of the primary shaft 13 at the time of closing the power assisted clutch 15.

In the case of a gear progression, i.e. during a change from a lower gear to a higher gear, the electronic control unit 11 may actuate the power assisted brake 23 to transmit through the epycicloidal gear 19 from the drive shaft 6 to the secondary shaft 14 of the gearbox 12 a driving torque so as to avoid the interruption of the driving torque applied to the driving wheels 3. Specifically, in the case of a change from a lower gear to a higher gear the electronic control unit 11 determines the order of the desired value of driving torque to be applied to the driving wheels 3 as a function of the driving torque applied to the driving wheels 3 immediately before opening the clutch 15, the higher gear to be engaged, the current motion of the motor vehicle 1, and/or the commands from the driver. It must be noted that the desired value of driving torque to be applied to the driving wheels 3 may also vary in time, because it is normal that the actual value of driving torque applied to the driving wheels 3 is modified as an effect of the change of gear; i.e. during the progression of gears the actual value of the driving torque applied to the driving wheels 3 immediately before the change of gear is higher than the actual value of driving torque applied to the driving wheels 3 immediately after the change of gear as an effect of the increase in the gear ratio set by the gearbox 12. Generally, in the case a higher gear is engaged, the brake 23 is controlled such that the decrease of the driving torque applied to the driving wheels 3 is located in an initial step and the driving torque applied to the driving wheels 3 is subsequently maintained substantially constant.

Then, the electronic control unit 11, simultaneously to the opening of the clutch 15, actuates the brake 23 to transmit through the epicycloidal gear 19 from the drive shaft 6 to the secondary shaft 14 of the gearbox 12 a torque substantially equal to the desired value of driving torque to be applied to the driving wheels 3. It must be pointed out that the actual value of the torque transmitted through the epicycloidal gear 19 is slightly higher with respect to the desired value of driving torque to be applied to the driving wheels 3 to consider the unavoidable losses of torque that occur in the transmission chain. Furthermore, it must be noted that the breaking torque applied by the brake 23 to the third rotating element 22 of the epicycloidal gear 19 is quantitatively different, also considering the gear ratios of the system, as compared to the breaking torque which would be delivered by the internal combustion engine 5 with the gear engaged, because the brake 23 operates downstream of the inertia of the internal combustion engine 5 and because the brake 23 only operates transiently.

Finally, simultaneously to the closing of the clutch 15, the electronic control unit 11 releases the brake 23 to interrupt the transfer of torque through the epicycloidal gear 19 from the drive shaft 6 to the secondary shaft 14 of the gearbox 12.

It must be noted that the action on the brake 23 must be simultaneous and complementary to the action on the power assisted clutch 15 (both when the power assisted clutch 15 is opened and when the power assisted clutch 15 is closed) such that excessively sudden (positive and negative) variations on the driving torque applied to the driving wheels 3 are avoided.

Furthermore, during the change of gear, i.e. when the clutch 15 is open, the electronic control unit 11 must determine the value of the angular speed co, of the primary shaft 13 set by the higher gear and by the current motion of the motor vehicle 1, and must drive the internal combustion engine 5 such that, when the clutch 15 is open, the internal combustion engine 5 generates a torque sufficient to guarantee the application of the desired value of driving torque to the driving wheels 3 (i.e. to allow the epicycloidal gear 19 to transmit from the drive shaft 6 to the secondary shaft 14 of the gearbox 12 a torque substantially equal to the desired value of driving torque to be applied to the driving wheels 3) and that, when the clutch 15 is closed, the drive shaft 6 has an angular speed $\omega_m$ equal to the angular speed co of the primary shaft 13 set by the higher gear and by the current motion of the motor vehicle 1.

Preferably, the driving of the internal combustion engine 5 during a change of gear provides that a reference profile be generated for the angular speed $\omega_m$ of drive shaft 6, in which the final angular speed of the reference profile is equal to the angular speed $\omega_1$ of the primary shaft 13 set by the higher gear and by the current motion of the motor vehicle 1, and to drive the internal combustion engine 5 to lead the angular speed $\omega_m$ of the drive shaft 6 to follow the reference profile.

Normally, the initial angular speed of the reference profile is equal to the angular speed $\omega_m$ of the drive shaft 6 immediately before the opening of the clutch 15 and the reference profile displays a final portion (for example, having a parabolic trend) tangent to the angular speed $\omega_1$ of the primary shaft 13 set by the higher gear and by the current motion of the motor vehicle 1.

The driving of the internal combustion engine 5 using the reference profile provides that a reference value of driving torque be generated to be requested from the internal combustion engine 5 to lead the angular speed $\omega_m$ of the drive shaft 6 to follow the reference profile. By way of example, the reference value of driving torque may comprise a first open loop contribution depending on the desired value of driving torque to be applied to the driving wheels 3 through the epicycloidal gear 19, and a second open loop contribution depending on the difference between the current angular speed $\omega_m$ of the drive shaft 6 and the reference profile.

According to the above, the power assisted brake 23 comprises a hydraulic servo control 24 which is pressure controlled; during the design and construction step of the power assisted transmission 7 a transfer function of the brake 23 is determined, which bijectively associates to each hydraulic pressure applied to the hydraulic servo control 24 of the brake 23 a corresponding value of torque transmitted through the epicycloidal gear 19 from the drive shaft 6 to the secondary shaft 14 of the gearbox 12. During use, to actuate the brake 23 during a change of gear, the desired value is determined for the pressure to be applied to the hydraulic servo control 24 of the brake 23 as a function of the desired value of driving torque to be applied to the driving wheels 3, by using the transfer function of the brake 23; therefore, such a desired value of the pressure is applied to the hydraulic servo control 24 of the brake 23 in a known manner.

According to a preferred embodiment, the transfer function of the brake 23 is parametered as a function of the temperature of the brake 23 itself; accordingly, the current temperature of the brake 23 is estimated during use and the desired value of the pressure to be applied to the hydraulic servo control 24 of the brake 23 is determined, by using the transfer function of the brake 23, as a function of the desired value of driving torque to be applied to the driving wheels 3 and as a function of the current temperature of the brake 23.

Preferably, the transfer function of the brake 23 may be updated during the transition from a lower gear to a higher gear when the brake 23 itself is actuated. The update of the transfer function of the brake 23 provides that a desired law of motion of the motor vehicle 1 be determined during the transition from the lower gear to the higher gear, which would be obtained by applying exactly the desired value of driving torque to be applied to the driving wheels 3 to the driving wheels 3, that an actual law of motion of the motor vehicle 1 be determined during the transition from the lower gear to the higher gear, that the desired law of motion of the motor vehicle 1 be compared to the actual law of motion of the motor vehicle 1, and that the transfer function of the brake 23 be updated as a function of the result of the comparison between the desired law of motion of the motor vehicle 1 and the actual law of motion of the motor vehicle 1.

By way of example, the determination of the desired law of motion of the motor vehicle 1 provides that a desired acceleration of the driving wheels 3 be determined and the determination of the actual law of motion of the motor vehicle 1 provides that an actual acceleration of the driving wheels 3 be determined. In this case, if the driving wheels 3 have an actual acceleration higher with respect to the desired acceleration, then the action of the brake 23 has determined a torque transmission through the epicycloidal gear 19 higher than expected (i.e. higher than estimated by the transfer function of the brake 23) and vice versa.

According to a possible embodiment, a decay index of the transfer function of the brake 23 is calculated by comparing the desired law of motion of the motor vehicle 1 with the actual law of motion of the motor vehicle 1 and an update index of the transfer function of the brake 23 is calculated by means of a filtering of the decay index. A plurality of decay indexes may be calculated during different changes of gear so as to calculate the update index of the transfer function of the brake 23 by means of a statistical elaboration of the plurality of decay indexes.

According to a preferred embodiment, an intermediate gear is defined in the gearbox 12 and the gear ratios of the epicycloidal gear 19 are dimensioned such that the third rotating element 22 of the epicycloidal gear 19 rotates with an opposite direction with respect to the first rotating element 20 of the epicycloidal gear 19 when a lower gear than the intermediate gear is engaged in the gearbox, rotates with the same direction with respect to the first rotating element 20 of the epicycloidal gear 19 when a higher gear than the intermediate gear is engaged in the gearbox 12, and is substantially motionless when the intermediate gear is engaged in the gearbox 12. Actually, when the intermediate gear is engaged in the gearbox 12, the third rotating element 22 of the epicycloidal gear 19 is never precisely motionless because it is not normally possible to obtain the exact gear ratio which would be necessary having a limited integer of teeth.

The brake 23 is actuated during the transition from a lower gear to a higher gear only when the lower gear is lower than the intermediate gear, i.e. the higher gear is not higher than the intermediate gear. Such a limitation is due to the fact that it is possible to transmit torque from the drive shaft 6 to the secondary shaft 14 of the power assisted gearbox 12 through the epicycloidal gear 19 only when the first rotating element 20 rotates with an opposite direction with respect to a third rotating element 22; instead, when the first rotating element 20 rotates with the same direction with respect to the third rotating element 22, it is possible to transmit torque only from the secondary shaft 14 of the power assisted gearbox 12 to the drive shaft 6.

Preferably, the intermediate gear is the third gear, accordingly, the brake 23 is actuated during the transition from a lower gear to a higher gear only in the transition from the first to the second gear and in the transition from the second to the third gear.

In other words, the definition of the intermediate gear establishes the usage limit of the epicycloidal gear 19 to transmit torque from the drive shaft 6 to the secondary shaft 14 of the power assisted gearbox 12 when the power assisted clutch 15 is open. The definition of the intermediate gear is less important, because it allows to lead the epicycloidal gear 19 to actually be employable without needing to request the generation of an excessively high torque from the internal combustion engine 5. That is, the definition of the intermediate gear limits the use of the epicycloidal gear 19, but at the same time allows to render the use of the epicycloidal gear 19 efficient and effective (i.e. it may obtain a torque transmission from the drive shaft 6 to the secondary shaft 14 of the power assisted gearbox 12 without "killing" the internal combustion engine 5).

According to an alternative embodiment, the epicycloidal gear 19 could display a gear ratio varying as a function of the angular rotational speed of the second rotating element 21 (i.e. as a function of the angular speed $\omega_2$ of the secondary shaft 14 of the power assisted gearbox 12, i.e. as a function of the rotational speed of the driving wheels 3). In this manner, it is possible to vary the intermediate gear as a function of the angular rotational speed of the second rotating element 21 by varying the gear ratio of the epicycloidal gear 19. For instance, the intermediate gear could be the third gear when the second rotating element 21 displays a low number of revolutions and the intermediate gear could be the fourth gear when the second rotating element 21 displays a high number of revolutions. In this manner, it is possible to extend the use of the epicycloidal gear 19 without excessively damaging the internal combustion engine 5.

According to a preferred embodiment, in order to render the gear ratio of the epicycloidal gear 19 variable, the epicycloidal gear 19 itself could display conical toothed wheels such that the second rotating element 21 may be axially displaced with respect to the third rotating element 22 as a function of the angular rotational speed of the second rotating element 21. In this case, the epicycloidal gear 19 should comprise a centrifugal action actuator device which axially displaces the second rotating element 21 with respect to the third rotating element 22 as a function of the angular rotational speed of the second rotating element 21. The centrifugal action actuator device could comprise a number of spheres which rotate together with the second rotating element 21 of the epicycloidal gear 19 and are radially displaceable possibly against springs to exert an axial thrust deriving from the centrifugal force.

According to a possible embodiment, during the down shift from the fifth gear to the fourth gear and from the fourth gear to the third gear the brake 23 could be actuated to use the epicycloidal gear 19 so as to transmit torque from the secondary shaft 14 of the power assisted gearbox 12 of the drive shaft 6. Obviously, this function is useful only in the case of release down shift to anticipate the effect of exhaust brake. In this case, the order of a desired value of exhaust brake torque to be applied to the driving wheels 3 is determined as a function of the lower gear to be engaged, of the current motion of the motor vehicle 1, and/or of the commands from the driver; the brake 23 is actuated simultaneously to the opening of the clutch 15 to transmit through the epicycloidal gear 19 from the secondary shaft 14 of the gearbox 12 to the drive shaft 6 a torque substantially equal to the desired value of exhaust brake torque to be applied to the driving wheels 3; the value of the angular speed $\omega_1$ of the primary shaft 13 set by the lower gear and by the current motion of the motor vehicle 1 is determined; the internal combustion engine 5 is driven such that, when the clutch 15 is closed, the drive shaft 6 has an angular speed $\omega_m$ equal to the angular speed $\omega_1$ of the primary shaft 13 set by the lower gear and by the current motion of the motor vehicle 1; and the brake 23 is released simultaneously to the closing of the clutch 15 to interrupt the torque transfer through the epicycloidal gear 19 from the secondary shaft 14 of the gearbox 12 of the drive shaft 6.

The above described power assisted propulsion system 4 described above displays many advantages, because it is structurally very similar to a standard power assisted propulsion system and is therefore easy and cost-effective to be constructed starting from a standard power assisted propulsion system.

Furthermore, the above described power assisted propulsion system 4 displays the high performance which is characteristic of the standard mechanical gearboxes and therefore much higher than the standard torque converter automatic gearboxes.

Finally, the above described power assisted propulsion system 4 does not display any torque hole for the driving wheels 3 at least during a change of gear from the first gear to the second gear and from the second gear to the third gear. It must be noted that during the progression of the gears the torque hole for the driving wheels 3 caused by a change of gear has a greater effect on the occupants of the vehicle for low gears (transition from the first gear to the second gear and from the second gear to the third gear), whereas it has a lower effect on the occupants of the vehicle for the high gears (transition from the third gear to the fourth gear and following) because in the low gears the vehicle has a much higher instantaneous longitudinal acceleration. Accordingly, the remaining torque hole that occurs during a transition from the third gear to the fourth gear and following is poorly perceivable and therefore generally acceptable.

Figure 3:
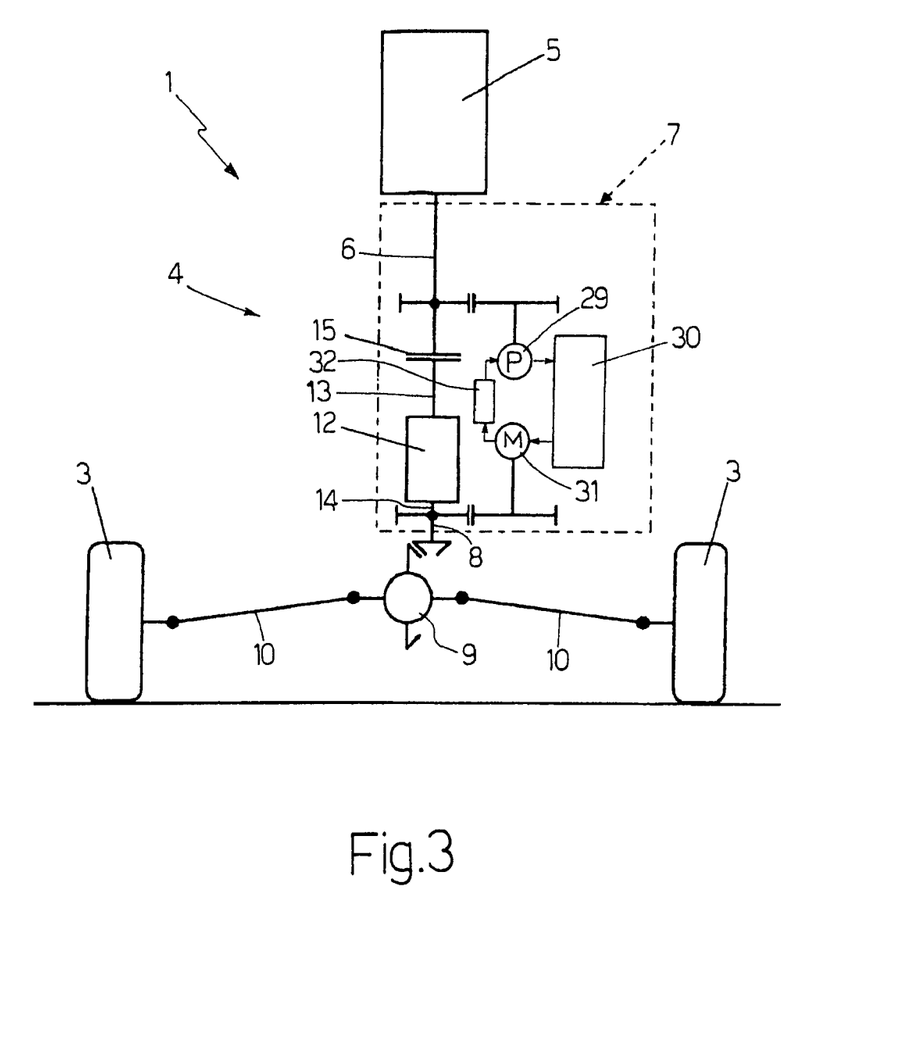
FIG. 3 is a diagrammatic plan view of a rear drive vehicle provided with a power assisted propulsion system designed according to a different embodiment.

According to a further embodiment shown in FIG. 3, there is no epicycloidal gear 19. In this embodiment, there are provided a pump 29 actuated by the drive shaft 6 (or alternatively by the primary shaft 13 of the gearbox 12), a hydraulic accumulator 30 containing a fluid which is pressurized by the pump 29, and a hydraulic engine 31 actuated by the pressurized fluid and adapted to transmit torque to the secondary shaft 14 of the gearbox 12 (or alternatively to the transmission shaft 8). Normally, the pump 29 maintains the fluid pressurized within the hydraulic accumulator 30. When the power assisted clutch 15 is opened to perform a change of gear, the hydraulic engine 31 uses the pressurized fluid found within the hydraulic accumulator 30 to transmit torque to the secondary shaft 14 of the gearbox 12. Thereby, even when the power assisted clutch 15 is open, the driving wheels 3 may receive the driving torque and therefore the torque hole is eliminated during a change of gear.

Normally, there is also a tank 32 for the fluid at an ambient pressure, from which the pump 20 withdraws the fluid and in which the hydraulic engine 31 discharges the fluid. Obviously, the various components of the above described hydraulic circuit are reciprocally connected by means of electro valves (not shown) driven by the electronic control unit 11.

Figure 4:
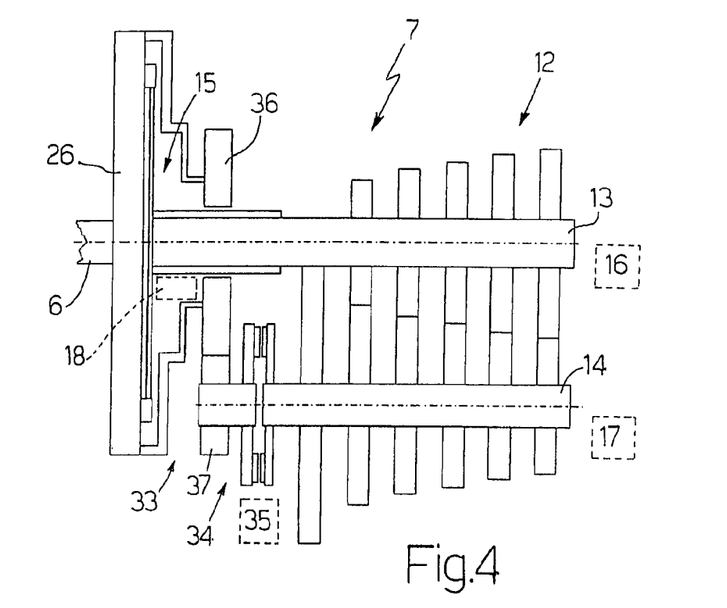
FIG. 4 is a diagrammatic view of a different embodiment of the power assisted transmission of the propulsion system in FIG. 1.
Figure 5:
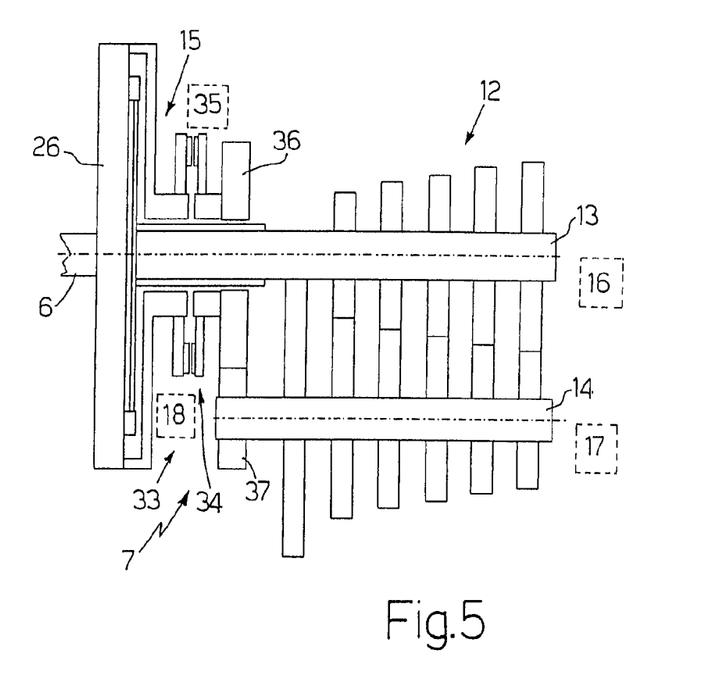
FIG. 5 is a diagrammatic view of a variant of the power assisted transmission in FIG. 4.

According to a further embodiment shown in FIGS. 4 and 5, there is no epicycloidal gear 19. In this embodiment, there is provided a chain 33 of gears, which transmits motion directly from the drive shaft 6 to the secondary shaft 14 of the gearbox 12 and a further power assisted clutch 34 driven by a servo control 35 and interposed along the chain 33 of gears to connect and disconnect the drive shaft 6 to the secondary shaft of the gearbox 12.

According to the embodiment shown in FIG. 4, the chain 33 of gears comprises a toothed wheel 36 integral with the drive engine 6 and a toothed wheel 37 which engages the toothed wheel 36 and is connected to the secondary shaft 14 of the gearbox 12 by the interposition of the clutch 34.

According to the embodiment shown in figure 5, the chain 33 of gears comprises a toothed wheel 36 which is connected to the drive shaft 6 by the interposition of the clutch 34 and a toothed wheel 37 which engages the toothed wheel 37 and is integral with the secondary shaft 14 of the gearbox 12.

It is apparent that also in the embodiments shown in FIGS. 3, 4 and 5 the above described control methods may be at least partially applied with reference to the embodiment shown in FIGS. 1 and 2.

As far as the embodiment shown in FIG. 3 is concerned, the engine 31 may be controlled by defining a function of transfer function (quite similar to the transfer function of the brake 23), which bijectionally associates a torque value applied to the secondary shaft 14 of the gearbox 12 to each corresponding hydraulic flow rate applied to the engine 31. The transfer function of the engine 31 may be updated during the transition from a lower gear to a higher gear as previously described.

As far as the embodiment shown in FIGS. 4 and 5 is concerned, the further clutch 34 may be controlled by defining a function of transfer function (quite similar to the transfer function of the brake 23), which bijectionally associates a torque value transmitted to the chain 33 of gears from the drive shaft 6 to the secondary shaft 14 of the gearbox 12 to each corresponding hydraulic pressure applied to the servo control 35. The transfer function of the further clutch 34 may be parametered as a function of the temperature of the further clutch 34 itself as previously described. Furthermore, the transfer function of the further clutch 34 may be updated during the transition from a lower gear to a higher gear as previously described.

The invention claimed is:

1. A method for controlling a power assisted propulsion system (4) in a motor vehicle (1) so as to perform a transition from a lower gear to a higher gear without interrupting a driving torque applied to driving wheels (3); the propulsion system (4) comprises an internal combustion engine (5) provided with a drive shaft (6) and a power assisted transmission (7) comprising:

a power assisted mechanical gearbox (12) operated by at least one first servo control (16, 17) and provided with a primary shaft (13) connectable to the drive shaft (6) and a secondary shaft (14) coupled to a transmission shaft (8) which transmits motion to the driving wheels (3);

a power assisted clutch (15) operated by at least one second servo control (18) and interposed between the drive shaft (6) and the primary shaft (13) of the gearbox (12) to couple and decouple the drive shaft (6) to the primary shaft (13) of the gearbox (12);

a power assisted brake (23) operated by at least one third servo control (24); and an epicycloidal gear (19) having three rotating elements (20, 21, 22): a first rotating element (20) coupled to the drive shaft (6), a second rotating element (21) coupled to the secondary shaft (14) of the gearbox, and a third rotating element (22) coupled to the brake (23);
the control method comprises:
opening the clutch (15) to separate the primary shaft (13) of the gearbox (12) from the drive shaft (6);
disengaging the lower gear;
engaging the higher gear; and
closing the clutch (15) to couple the primary shaft (13) of the gearbox (12) to the drive shaft (6);
determining an order of a desired value of driving torque to be applied to the driving wheels (3) as a function of the driving torque applied to the driving wheels (3) immediately before opening the clutch (15), the higher gear to be engaged, a current motion of the vehicle (1), and/or commands from the driver;
actuating the brake (23) simultaneously to the opening of the clutch (15) to transmit a torque substantially equal to the desired value of driving torque to be applied to the driving wheels (3) through the epicycloidal gear (19) from the drive shaft (6) to the secondary shaft (14) of the gearbox (12);
determining a value of the angular speed ($\omega_t$) of the primary shaft (13) set by the higher gear and by the current motion of the vehicle (1);
driving the internal combustion engine (5) such that, when the clutch (15) is open, the internal combustion engine (5) generates a torque sufficient to allow the epicycloidal gear (19) to transmit from the drive shaft (6) to the secondary shaft (14) of the gearbox (12) a torque substantially equal to the desired value of driving torque to be applied to the driving wheels (3) and that, when the clutch (15) is closed, the drive shaft (6) has an angular speed ($\omega_m$) equal to the angular speed ($\omega_t$) of the primary shaft (13) set by the higher gear and by the current motion of the motor vehicle (1); and
releasing the brake (23) simultaneously to the closing of the clutch (15) to interrupt the torque transfer through the epicycloidal gear (19) from the drive shaft (6) to the secondary shaft (14) of the gearbox
wherein the epicycloidal gear (19) comprises a gear ratio (7) which varies as a function of an angular rotational speed of the second rotating element (21).

2. A control method according to claim 1, wherein the brake (23) comprises a hydraulic servo control (24) driven by pressure; actuating the brake (23) to transmit a torque through the epicycloidal gear (19) from the drive shaft (6) to the secondary shaft (14) of the gearbox (12) comprises:
determining a transfer function of the brake (23), which bijectively associates to each hydraulic pressure applied to the hydraulic servo control (24) of the brake (23) a corresponding value of torque transmitted through the epicycloidal gear (19) from the drive shaft (6) to the secondary shaft (14) of the gearbox (12);
determining, by using the transfer function of the brake (23), a desired value of the pressure to be applied to the hydraulic servo control (24) of the brake (23) as a function of the desired value of driving torque to be applied to the driving wheels (3); and
applying the desired value of the pressure to the hydraulic servo control (24) of the brake (23).

3. A control method according to claim 2, comprising:
parameterizing the transfer function of the brake (23) as a function of the temperature of the brake (23) itself;
estimating a current temperature of the brake (23); and
determining, by using the transfer function of the brake (23), the desired value of the pressure to be applied to the hydraulic servo control (24) of the brake (23) as a function of the desired value of driving torque to be applied to the driving wheels (3) and as a function of the current temperature of the brake (23).

4. A control method according to claim 2, further comprising updating the transfer function of the brake (23) during the transition from the lower gear to the higher gear.

5. A control method according to claim 4, wherein updating the transfer function of the brake (23) comprises:
determining a desired law of motion of the motor vehicle (1) during the transition from the lower gear to the higher gear that would be obtained by applying exactly the desired value of driving torque to be applied to the driving wheels (3) to the driving wheels (3);
determining an actual law of motion of the motor vehicle (1) during the transition from the lower gear to the higher gear;
comparing the desired law of motion of the motor vehicle (1) to the actual law of motion of the motor vehicle (1); and
updating the transfer function of the brake (23) as a function of the result of the comparison between the desired law of motion of the motor vehicle (1) and the actual law of motion of the motor vehicle (1).

6. A control method according to claim 5, wherein determining the desired law of motion of the motor vehicle (1) comprises determining a desired acceleration of the driving wheels (3) and determining the actual law of motion of the motor vehicle (1) comprises determining an actual acceleration of the driving wheels (3).

7. A control method according to claim 5, further comprising:
calculating a decay index of the transfer function of the brake (23) by comparing the desired law of motion of the motor vehicle (1) to the actual law of motion of the motor vehicle (1); and
calculating an update index of the transfer function of the brake (23) by a filtering of the decay index.

8. A control method according to claim 7, further comprising:
calculating a plurality of decay indexes during different changes of gear; and
calculating an update index of the transfer function of the brake (23) by a statistical elaboration of the plurality of decay indexes.

9. A control method according to claim 1, wherein the first rotating element (20) of the epicycloidal gear (19) is a sun gear, the second rotating element (21) of the epicycloidal gear (19) comprises planet gears and a planet carrier, and the third rotating element (22) of the epicycloidal gear (19) is an annulus.

10. A control method according to claim 9, wherein the sun gear of the first rotating element (20) comprises 56-60 teeth, the two planet gears of the second rotating element (21) comprise 17-19 teeth, and the annulus of the third rotating element (22) comprises 90-98 teeth.

11. A control method according to claim 1, wherein the first rotating element (20) of the epicycloidal gear (19) is an annulus, the second rotating element (21) of the epicycloidal gear (19) comprises planet gears and a planet carrier, and the third rotating element (22) of the epicycloidal gear (19) is a sun gear.

12. A control method according to claim 1, further comprising:
defining an intermediate gear in the gearbox (12);
dimensioning gear ratios (7) of the epicycloidal gear (19) such that the third rotating element (22) of the epicycloidal gear (19) rotates with an opposite direction with respect to the first rotating element (20) of the epicycloidal gear (19) when a higher gear than the intermediate gear is engaged in the gearbox (12); and actuating the brake (23) during a transition from a lower gear to a higher gear only when the lower gear is lower than the intermediate gear, such that the higher gear is not higher than the intermediate gear.

13. A control method according to claim 12, wherein the third rotating element (22) of the epicycloidal gear (19) is substantially motionless when the intermediate gear is engaged in the gearbox (12).

14. A control method according to claim 12, wherein the gearbox (12) comprises at least five gears and the intermediate gear is the third gear.

15. A control method according to claim 1, wherein the epicycloidal gear (19) comprises conical toothed wheels such that the second rotating element (21) may be axially displaced with respect to the third rotating element (22) as a function of the angular rotational speed of the second rotating element (21).

16. A control method according to claim 15, wherein the epicycloidal gear (19) comprises a centrifugal action actuator device, which axially displaces the second rotating element (21) with respect to the third rotating element (22) as a function of the angular rotational speed of the second rotating element (21).

17. A control method according to claim 16, wherein the centrifugal action actuator device comprises a number of spheres which rotate together with the second rotating element (21) of the epicycloidal gear (19) and are radially displaceable to exert an axial thrust deriving from the centrifugal force.

18. A control method according to claim 1, further comprising:
defining an intermediate gear in the gearbox (12);
dimensioning gear ratios (7) of the epicycloidal gear (19) such that the third rotating element (22) of the epicycloidal gear (19) rotates with an opposite direction with respect to the first rotating element (20) of the epicycloidal gear (19) when a lower gear than the intermediate gear is engaged in the gearbox (12) and rotates with a same direction with respect to the first rotating element (20) of the epicycloidal gear (19) when a higher gear than the intermediate gear is engaged in the gearbox (12); and
actuating the brake (23) during the transition from a lower gear to a higher gear only when the lower gear is lower than the intermediate gear, such that the higher gear is not higher than the intermediate gear.

19. A control method according to claim 18, wherein the third rotating element (22) of the epicycloidal gear (19) is substantially motionless when the intermediate gear is engaged in the gearbox (12).

20. A control method according to claim 18, further comprising varying the intermediate gear as a function of a rotational angular speed of the second rotating element (21) by varying the gear ratio (7) of the epicycloidal gear (19).

21. A control method according to claim 20, wherein the gearbox (12) comprises at least five gears; the intermediate gear is the third gear when the second rotating element (21) executes a first number of revolutions and the intermediate gear is the fourth gear when the second rotating element (21) executes a second number of revolutions higher than the first number of revolutions.

22. A control method according to claim 1, wherein the drive shaft (6) is provided with a flywheel (26), which is arranged upstream of the clutch (15); the first rotating element (20) of the epicycloidal gear (19) is integral with the flywheel (26).

23. A control method according to claim 1, wherein driving the internal combustion engine (5) further comprises:
generating a reference profile for the angular speed ($\omega_m$) of the drive shaft (6) in which a final angular speed of the reference profile is equal to an angular speed ($\omega_l$) of the primary shaft (13) set by the higher gear and by the current motion of the motor vehicle (1); and
driving the internal combustion engine (5) to generate a torque equal to the desired value of driving torque to be applied to the driving wheels (3) and to lead the angular speed ($\omega_m$) of the drive shaft (6) to follow the reference profile.

24. A control method according to claim 23, wherein the initial angular speed of the reference profile is equal to the angular speed ($\omega_m$) of the drive shaft (6) immediately before opening of the clutch (15).

25. A control method according to claim 23, wherein the reference profile comprises an end portion tangent to the angular speed ($\omega_l$) of the primary shaft (13) set by the higher gear and by the current motion of the motor vehicle (1).

26. A control method according to claim 25, wherein the reference profile comprises an end portion having a parabolic trend.

27. A control method according to claim 23, wherein driving the internal combustion engine (5) comprises generating a reference value of driving torque to be requested to the internal combustion engine (5) to lead the reference profile to follow the angular speed ($\omega_m$) of the drive shaft (6).

28. A control method according to claim 27, wherein the reference value of driving torque comprises:
a first open loop contribution depending on the desired value of driving torque to be applied to the driving wheels (3) through the epicycloidal gear (19); and
a second open loop contribution depending on a difference between the current angular speed ($\omega_m$) of the drive shaft (6) and the reference profile.

29. A method for controlling a power assisted propulsion system (4) in a motor vehicle (1) such that a transition from a higher gear to a lower gear is performed thus anticipating the effect of exhaust brake; the propulsion system (4) comprises an internal combustion engine (5) provided with a drive shaft (6) and a power assisted transmission comprising:
a power assisted mechanical gearbox (12) operated by a first servo control (16, 17) and provided with a primary shaft (13) connectable to the drive shaft (6) and a secondary shaft (14) connected to a transmission shaft (8) which transmits motion to the driving wheels (3);
a power assisted clutch (15) operated by at least one second servo control (18) and interposed by the driving shaft (6) and the primary shaft (13) of the gearbox (12) to couple and decouple the drive shaft (6) to the primary shaft (13) of the gearbox (12);
a power assisted brake (23) operated by at least one third servo control (24); and
an epicycloidal gear (19) having three rotating elements (20, 21, 22): a first rotating element (20) connected to the drive shaft (6), a second rotating element (21) connected to the secondary shaft (14) of the gearbox, and a third rotating element (22) connected to the brake (23);
the control method comprising:
opening the clutch (15) to separate the primary shaft (13) of the gearbox (12) of the drive shaft (6);
disengaging the higher gear,
engaging the lower gear, and closing the clutch (15) to couple the primary shaft (13) of the gearbox (12) to the drive shaft (6);

determining an order of a desired value of exhaust brake torque to be applied to the driving wheels (3) as a function of the lower gear to be engaged, a current motion of the motor vehicle (1), and/or commands from the driver;

actuating the brake (23) simultaneously to the opening of the clutch (15) to transmit through the epicycloidal gear (19) from the secondary shaft (14) of the gearbox (12) to the drive shaft (6) a torque substantially equal to the desired value of exhaust brake torque to be applied to the driving wheels (3);

determining a value of angular speed ($\omega_l$) of the primary shaft (13) set by the lower gear and by the current motion of the motor vehicle (1);

driving the internal combustion engine (5) such that, when the clutch (15) is closed, the drive shaft (6) has an angular speed ($\omega_m$) equal to the angular speed ($\omega_l$) of the primary shaft (13) set by the lower gear and by the current motion of the motor vehicle (1); and releasing the brake (23) simultaneously to the closing of the clutch (15) to interrupt the transfer of torque through the epicycloidal gear (19) from the secondary shaft (14) of the gearbox to the drive shaft (6) wherein the epicycloidal gear (19) comprises a gear ratio (7) which varies as a function of an angular rotational speed of the second rotating element (21).

30. A power assisted transmission (7) for a power assisted propulsion system (4) in a motor vehicle (1); the power assisted transmission (7) comprises:

a power assisted mechanical gearbox (12) operated by at least one servo control (16, 17) and provided with a primary shaft (13) connectable to the drive shaft (6) and a secondary shaft (14) coupled to a transmission shaft (8) which transmits motion to the driving wheels (3);

a power assisted clutch (15) operated by at least one servo control (18) and interposed between the drive shaft (6) and the primary shaft (13) of the gearbox (12) to couple and decouple the drive shaft (6) to the primary shaft (13) of the gearbox (12);

a power assisted brake (23); and an epicycloidal gear (19) having three rotating elements (20, 21, 22): a first rotating element (20) connected to the drive shaft (6), a second rotating element (21) coupled to the secondary shaft (14) of the gearbox, and a third rotating element (22) coupled to the brake (23);

the power assisted transmission (7) being characterised in that gear ratios (7) of the epicycloidal gear (19) are dimensioned such that the third rotating element (22) of the epicycloidal gear (19) rotates with an opposite direction with respect to the first rotating element (20) of the epicycloidal gear (19) when a lower gear than an intermediate gear is engaged in the gearbox and rotates with the same direction with respect to the first rotating element (20) of the epicycloidal gear (19) when a higher gear than the intermediate gear is engaged in the gearbox (12) wherein the epicycloidal gear (19) comprises a gear ratio (7) which varies as a function of an angular rotational speed of the second rotating element (21).

31. A power assisted transmission (7) according to claim 30, wherein the third rotating element (22) of the epicycloidal gear (19) is substantially motionless when the intermediate gear is engaged in the gearbox (12).

32. A power assisted transmission (7) according to claim 31, wherein the gearbox (12) comprises at least five gears and the intermediate gear is the third gear.

33. A power assisted transmission (7) according to claim 30, wherein the epicycloidal gear (19) comprises conical toothed wheels such that the second rotating element (21) may be axially displaced with respect to the third rotating element (22) as a function of the angular rotational speed of the second rotating element (21).

34. A power assisted transmission (7) according to claim 33, wherein the epicycloidal gear (19) comprises a centrifugal action actuator device which axially displaces the second rotating element (21) with respect to the third rotating element (22) as a function of the angular rotational speed of the second rotating element (21).

35. A power assisted transmission (7) according to claim 34, wherein the centrifugal action actuator device comprises a number of spheres which rotate together with the second rotating element (21) of the epicycloidal gear (19) and are radially displaceable to exert an axial thrust deriving from the centrifugal force.

36. A power assisted transmission (7) according to claim 30, wherein the intermediate gear is varied as a function of the rotational angular speed of the second rotating element (21) by varying the gear ratio (7) of the epicycloidal gear (19).

37. A power assisted transmission (7) according to claim 36, wherein the gearbox (12) comprises at least five gears; the intermediate gear is the third gear when the second rotating element (21) executes a first number of revolutions and the intermediate gear is the fourth gear when the second rotating element (21) executes a second number of revolutions higher than the first number of revolutions.

38. A power assisted transmission (7) according to claim 30, wherein the first rotating element (20) of the epicycloidal gear (19) is a sun gear, the second rotating element (21) of the epicycloidal gear (19) comprises planet gears and a planet carrier, and the third rotating element (22) of the epicycloidal gear (19) is an annulus.

39. A power assisted transmission (7) according to claim 38, wherein the sun gear of the first rotating element (20) comprises 56-60 teeth, the two planet gears of the second rotating element (21) comprise 17-19 teeth, and the annulus of the third rotating element (22) comprises 90-98 teeth.

40. A power assisted transmission (7) according to claim 30, wherein the first rotating element (20) of the epicycloidal gear (19) is an annulus, the second rotating element (21) of the epicycloidal gear (19) comprises planet gears and a planet carrier, and the third rotating element (22) of the epicycloidal gear (19) is a sun gear.

41. A power assisted transmission (7) according to claim 30, wherein the drive shaft (6) is provided with a flywheel (26), which is arranged upstream of the clutch (15); the first rotating element (20) of the epicycloidal gear (19) is integral with the flywheel (26).

* * * * *